United States Patent
Mitchell et al.

(10) Patent No.: US 6,469,856 B1
(45) Date of Patent: Oct. 22, 2002

(54) SYSTEM AND METHOD FOR CALIBRATING A CORNER FREQUENCY OF A TUNABLE FILTER EMPLOYED IN A READ CHANNEL OF A DATA STORAGE SYSTEM

(75) Inventors: Chad Edward Mitchell, Kasson; Rick Allen Philpott, Rochester; Jaydip Bhaumik, Rochester; Raymond Alan Richetta, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,277

(22) Filed: May 12, 2000

(51) Int. Cl.⁷ ............................. G11B 5/09; G11B 5/035
(52) U.S. Cl. ........................................ 360/65; 360/46
(58) Field of Search ............................... 360/46, 51, 65

(56) References Cited

U.S. PATENT DOCUMENTS

| | | | |
|---|---|---|---|
| 4,750,058 A | 6/1988 | Hirt et al. ........................ 360/46 |
| 5,162,678 A | 11/1992 | Yamasaki ...................... 327/331 |
| 5,321,559 A | 6/1994 | Nguyen et al. ................. 360/46 |
| 5,375,145 A | 12/1994 | Abbott et al. ................. 375/345 |
| 5,442,492 A | 8/1995 | Cunningham et al. ......... 360/46 |
| 5,463,603 A | 10/1995 | Petersen ...................... 369/48 |
| 5,491,447 A | 2/1996 | Goetschel et al. ........... 330/254 |
| 5,519,548 A | 5/1996 | Liepe et al. .................... 360/65 |
| 5,572,163 A | 11/1996 | Kimura et al. ............... 327/553 |
| 5,631,891 A | 5/1997 | Moritsugu et al. ........... 369/124 |
| 5,732,055 A | 3/1998 | Masaki et al. ................. 369/54 |
| 5,831,781 A | 11/1998 | Okamura ...................... 360/31 |
| 6,078,455 A | 6/2000 | Enarson et al. ............... 360/68 |
| 6,124,998 A | 9/2000 | Kanegae ...................... 360/68 |
| 6,144,513 A * | 11/2000 | Reed et al. .................... 360/51 |

FOREIGN PATENT DOCUMENTS

EP 0 521 653 A2 7/1993

OTHER PUBLICATIONS

"Automatic Gain Control with Equalizer", IBM Technical Disclosure Bulletin, vol. 21, No. 9, pp. 3569–3570, Feb. 1979.

* cited by examiner

Primary Examiner—Regina N. Holder
(74) Attorney, Agent, or Firm—Mark A. Hollingsworth

(57) ABSTRACT

A system and method provides for calibrating a corner frequency of a tunable filter coupled to a read channel of a data storage system to a desired frequency. A signal having a frequency equal to the target corner frequency is generated. A gain of the signal is adjusted to a gain threshold. The gain of the signal is then increased from the gain threshold by a pre-established amount, such as by 3 dB. The corner frequency of the signal is shifted until the gain of the signal is substantially equal to the gain threshold, at which point the corner frequency of the tunable filter is calibrated to the desired frequency. The signal generated is a peak-detectable signal. The corner frequency of a tunable filter may be a low or high corner frequency appropriate for filtering a data signal or a servo signal. The corner frequency calibration circuitry may be implemented in-situ the read channel circuitry of a data storage system.

30 Claims, 13 Drawing Sheets

SYSTEM AND METHOD FOR CALIBRATING A CORNER FREQUENCY OF A TUNABLE FILTER EMPLOYED IN A READ CHANNEL OF A DATA STORAGE SYSTEM

FIELD OF THE INVENTION

The present invention relates generally to filtering a signal read from a data storage medium and, more particularly, to a system and method for calibrating a corner frequency of a tunable filter used for filtering a signal read from a data storage medium.

BACKGROUND OF THE INVENTION

Tunable filters, such as integrated continuous time filters (CTFs), are known to be particularly useful when implemented in the read channel of a disk drive system for purposes of filtering readback signals obtained from a data storage disk. A typical disk drive system includes a magnetic medium for storing data in magnetic form and a number of transducers used to write and read magnetic data respectively to and from the medium. Digital information is typically stored in the form of magnetic transitions on a series of concentric, spaced tracks formatted on the surface of the magnetizable rigid data storage disks.

Reading data from a specified disk location is typically accomplished by using a read element of the read/write head assembly to sense the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

A filter employed in a read channel must generally be capable of accommodating variations in the data rate of the readback signals transmitted through the read channel. The ability to precisely tune such a filter is therefore of particular importance. It is generally considered imperative that a cutoff or corner frequency of a tunable filter used in such applications be adjustable with a high degree of precision. Such applications may also require that the tunable filter be adjustable within a range of selectable cutoff frequencies with high precision.

It is well understood in the art that tunable filters implemented in integrated circuits, such as VLSI chips for example, exhibit frequency response characteristics that are sensitive to technology and process variations. Technology variations, as well as factors resulting from circuit/filter design or implementation, often result in large tolerances with respect to the filter's specified cutoff frequency. Such tolerances can result in performance losses.

There exists a need for an apparatus and method for precisely adjusting the cutoff frequency of a tunable filter to a specified frequency or frequencies. There exists a need in the disk drive system manufacturing community for such an apparatus and method suitable for implementation in-situ a disk drive system and, more particularly, in-situ a read channel of the disk drive system. The present invention fulfills these and other needs.

SUMMARY OF THE INVENTION

The present invention is directed to a system and method for calibrating a corner frequency of a tunable filter coupled to a read channel of a data storage system to a desired frequency. A corner frequency calibration method according to the present invention involves generating a signal having a frequency equal to the target corner frequency and adjusting a gain of the signal to a gain threshold. The gain of the signal is adjusted from the gain threshold by a pre-established amount, such as by 3 dB.

The corner frequency of the signal is shifted until the gain of the signal is substantially equal to the gain threshold, at which point the corner frequency of the tunable filter is calibrated to the desired frequency. The calibrated corner frequency of the tunable filter may be a low or high corner frequency appropriate for filtering a data signal or a servo signal.

Shifting the corner frequency of the signal typically involves shifting the corner frequency of the signal downward in frequency. Shifting the corner frequency of the signal also involves shifting the corner frequency of the signal while the gain of the signal is held at a gain level equal to the gain threshold plus the pre-established gain amount.

The method may further involve converting the signal from analog form to digital form to produce a digital signal. In this case, adjusting the gain of the signal involves digitally adjusting the gain of the digital signal to a digital gain threshold. Increasing the gain of the digital signal involves incrementally increasing the digital signal gain. Generating the signal, according to one embodiment, involves generating a peak-detectable signal, such as a triangular or sinusoidal signal. The signal may be an ECL (emitter-coupled-logic) signal or CMOS (complimentary metal oxide semiconductor) signal, for example.

A circuit for calibrating a cutoff frequency of a filter to a desired frequency includes a tunable filter and a variable gain amplifier coupled to the filter and a signal source. The signal source generates a signal used in the corner frequency calibration procedure. An analog-to-digital converter (ADC) is coupled to the filter. The ADC produces a digitized signal in response to receiving the signal from the filter.

A control circuit is coupled to the filter, amplifier, signal source, and ADC. The control circuit adjusts a gain of the digitized signal to a gain threshold, increases the gain of the digitized signal from the gain threshold by a pre-established amount, and shifts the corner frequency of the digitized signal until the gain of the digitized signal is substantially equal to the gain threshold, at which point the corner frequency of the filter is calibrated to the desired frequency.

The signal source, according to one embodiment, includes a signal translator. The signal translator communicates a signal, such as an ECL signal, generated by the signal source to the amplifier. The signal source may further include a sequencer coupled to the signal translator. The sequencer includes servo inputs coupled to a servo voltage controlled oscillator and data inputs coupled to a tunable write voltage controlled oscillator.

The control circuit communicates control signals to the signal source to set the signal source to a frequency to be divided into the desired corner frequency. The control circuit comprises a digital peak detector circuit that digitally peak detects the gain of the digitized signal received from the ADC. The control circuit communicates a control signal to the ADC to set a sampling frequency of the ADC. ADC capture logic may be coupled between the ADC and the control circuit. A digital gain controller is typically coupled between the control circuit and the amplifier. The digital gain controller provides amplifier control signals to the amplifier in response to control signals received from the control circuit.

The filter may be implemented as a tunable lowpass filter, tunable highpass filter or tunable bandpass filter. The corner frequency calibration circuitry may be implemented in-situ a read channel of a disk drive system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
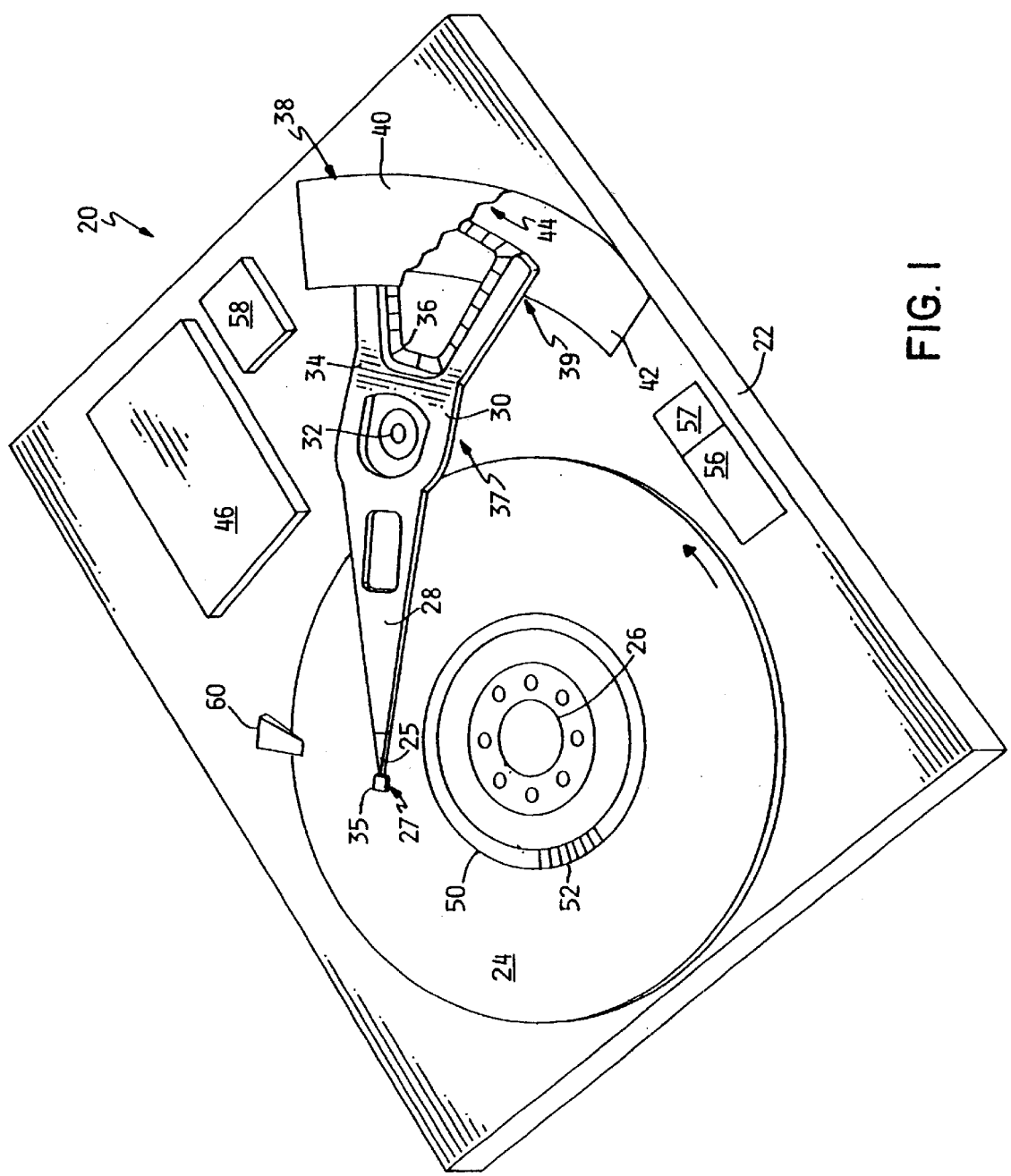
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and methodology in accordance with the principles of the present invention provide for high precision, programmable digital adjustment of a cutoff frequency of a tunable filter. In one embodiment, a tunable filter, such as a tunable lowpass filter, is provided in the read channel of a disk drive system. The cutoff frequency of the tunable lowpass filter is modifiable across a range of cutoff frequencies bounded by low and high cutoff frequencies, respectively.

The range of programmable cutoff frequencies, in accordance with one embodiment, is preferably sufficient to accommodate data rate variations in the readback signal obtained from a data storage medium of a disk drive system. The range of programmable cutoff frequencies is also sufficient to accommodate servo signal variations in the readback signal obtained from a data storage medium of a disk drive system.

In accordance with the principles of the present invention, a corner frequency calibration system and methodology provides a number of advantages unrealizable using conventional implementations. By way of example, a high degree of user programmability and programming flexibility is provided. After an initial set-up routine, for example, corner frequency calibration occurs automatically thereafter. Another advantage concerns a calibration approach which utilizes a digital peak detection system using ADC digitized samples.

A corner frequency calibration system and methodology of the present invention effectively eliminates the need to use fuse trims otherwise required when using older technologies. A corner frequency calibration approach consistent with the present invention provides for tremendous test and technology savings due to the internal nature of the circuitry and the methodology employed. A calibration engine, which is implemented in a control logic circuit, represents the control center for implementing a corner frequency calibration technique of the present invention. The control logic circuit provides for enabling and set-up of the appropriate circuits for use during corner frequency calibration.

A corner frequency calibration methodology of the present invention may be viewed as a calibration approach that uses the entire analog read path to digitize an internally generated signal that is frequency and gain controlled. In general terms, a corner frequency calibration procedure of the present invention passes a signal, having a frequency equal to the target corner frequency, through a continuous time filter (CTF). The gain of the signal is adjusted to a desired threshold, after which the gain is increased by a specified amount. Finally, the corner frequency of the signal is moved back until the desired threshold is again reached. This results in the CTF corner frequency being properly calibrated to the desired frequency.

It will be readily appreciated by those skilled in the art that the circuitry and methodologies described herein may be applied in filter applications other than those employed in a read channel of a disk drive system. The skilled artisan will also recognize that the cutoff frequency calibration techniques described herein may be used in connection with a broad range of tunable filters, including, tunable bandpass and highpass filters, for example.

In accordance with one embodiment of the present invention implemented in a disk drive system, high precision calibration of the cutoff frequency of a tunable lowpass filter may be accomplished using existing circuit elements of the read channel. A significant advantage associated with use of existing read channel circuitry concerns the elimination of technology and process tolerances that could otherwise adversely affect the accuracy of the filter's cutoff frequency, as well as the low and high cutoff frequencies of a range of selectable cutoff frequencies. Another advantage includes eliminating dependency on external signal processing electronics, which eliminates the need to allocate additional space to accommodate such external circuitry.

Figure 2:
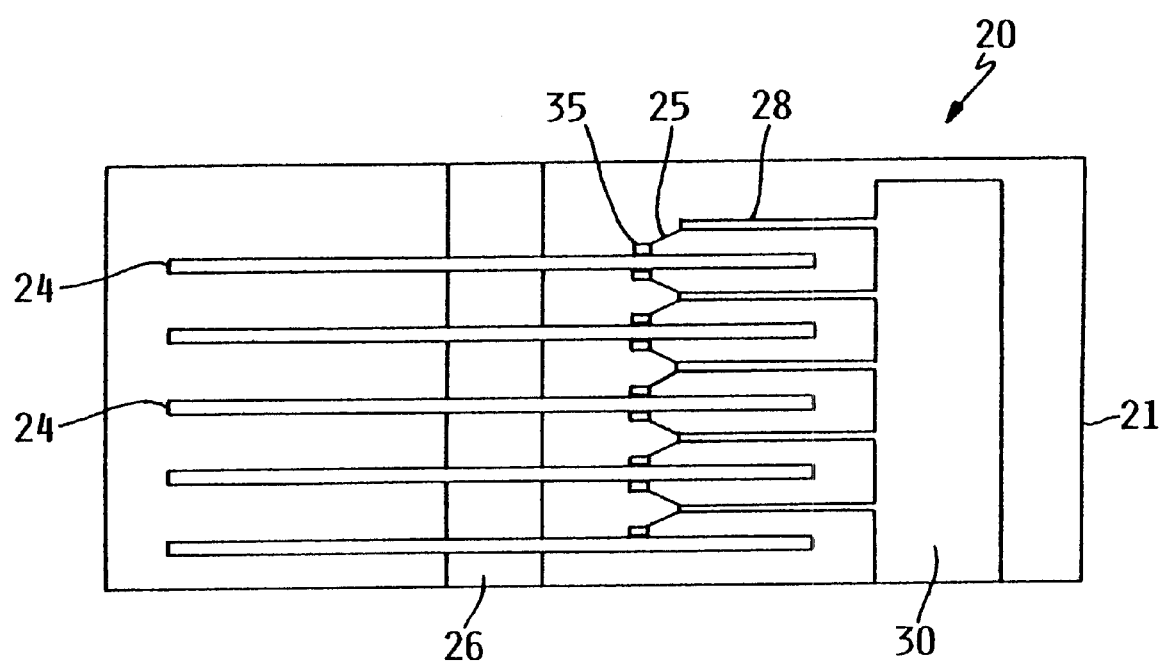
FIG. 2 is a side plan view of a disk drive system comprising a plurality of data storage disks.

Referring now to the drawings, and more particularly to FIGS. 1 and 2, there is illustrated a disk drive system 20 within which an apparatus and methodology for calibrating cutoff frequencies of a tunable filter provided in, or coupled to, a read channel according to the principles of the present invention may be implemented. The disk drive system 20 typically includes one or more rigid data storage disks 24, as is best shown in FIG. 2, which are stacked coaxially in a tandem spaced relationship, and rotate about a spindle motor 26 at a relatively high rate of rotation. As is depicted in FIG. 1, each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an air bearing produced by high speed of rotation of the disk 24. A conformal lubricant may alternatively be disposed on the disk surface 24 to reduce static and dynamic friction between the slider 35 and the disk surface 24.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56, disk drive controller 58, and read channel electronics 57 are depicted as separate devices in FIG. 1, it is understood that the functionality of two or all of these devices may be embodied in a single multi-purpose processor, which typically results in a reduced component cost.

Figure 3A:
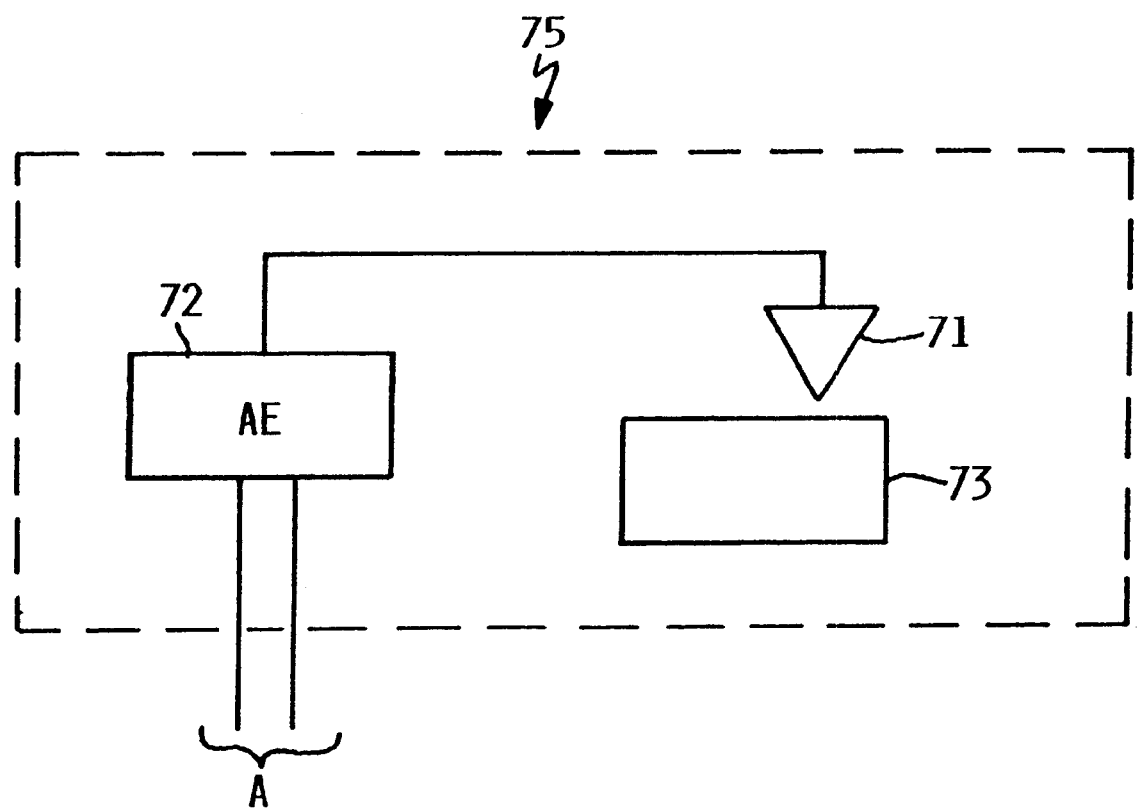
FIG. 3 is a diagram of circuitry provided in the read channel of a disk drive system, the circuitry including a tunable filter and circuit elements that provide for high precision, programmable digital adjustment of a cutoff frequency of the tunable filter in accordance with the principles of the present invention.
Figure 3B:
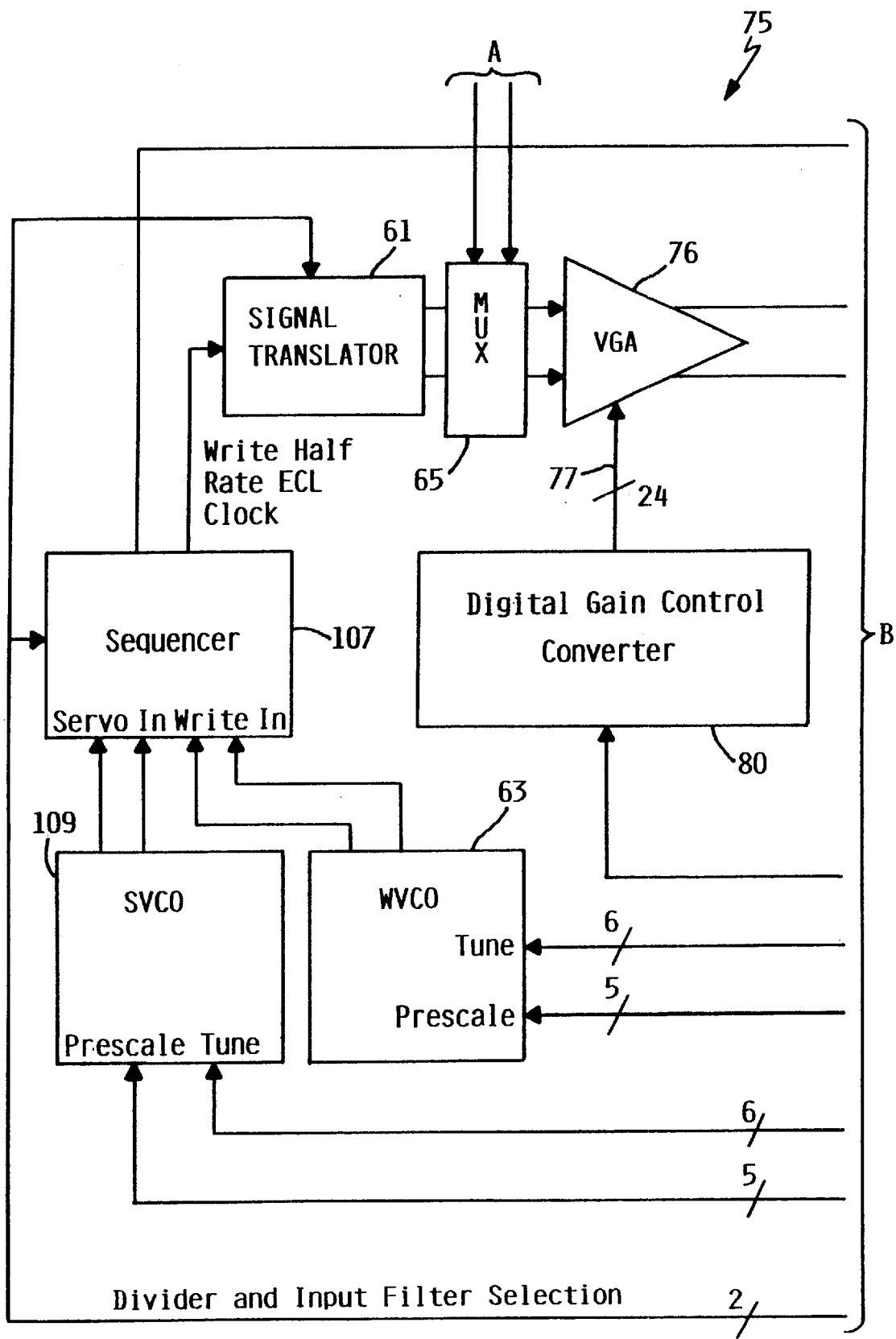
Figure 3C:
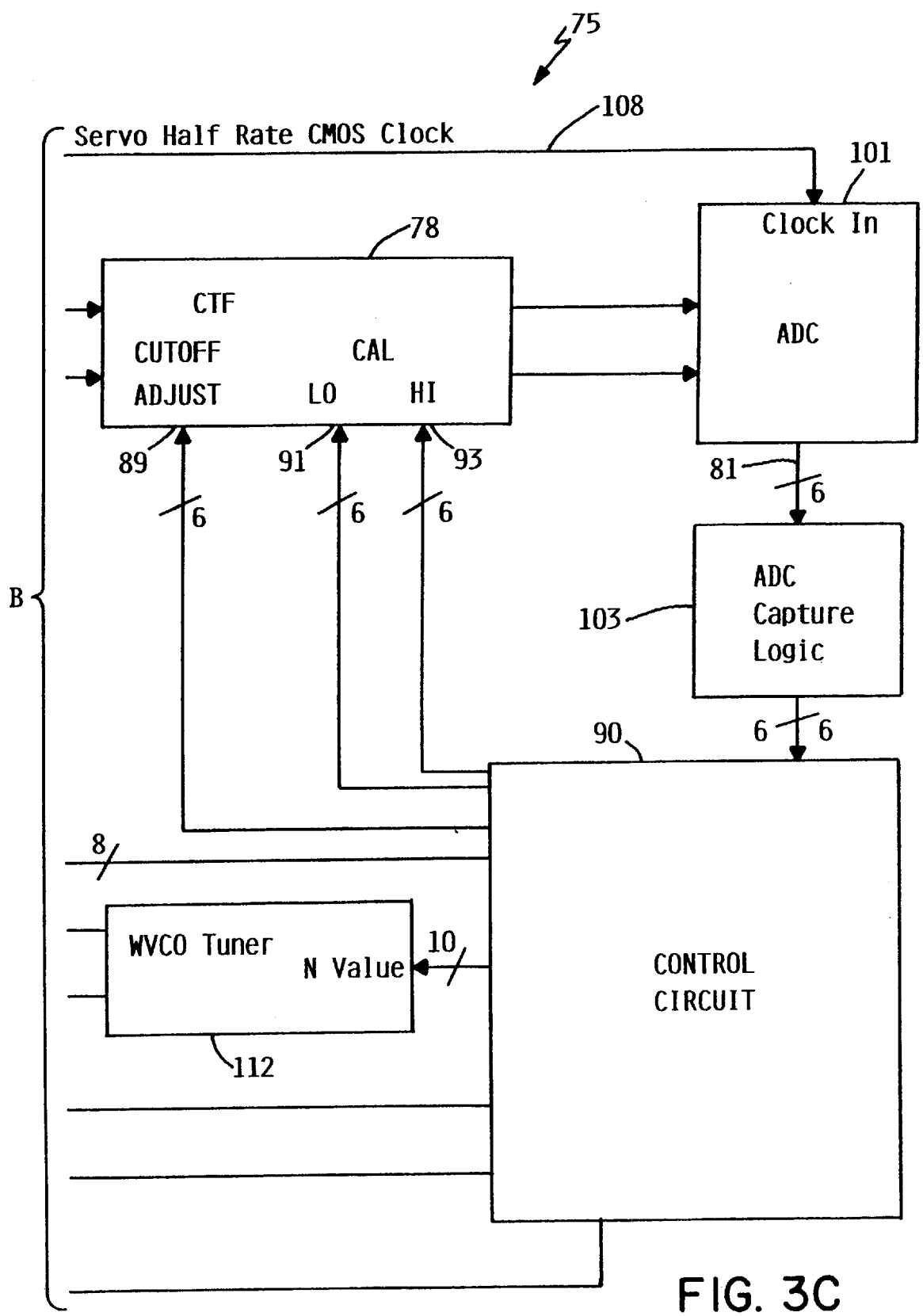

Turning now to FIG. 3, there is illustrated an embodiment of circuitry for calibrating a cutoff frequency of a tunable filter which, during normal operation of a disk drive system 20, receives a readback signal obtained from a data storage medium. The circuitry illustrated in FIG. 3, according to an embodiment of the present invention, represents existing circuitry provided in a read channel of a disk drive system which may be utilized using methodologies of the present invention for purposes of calibrating one or more cutoff frequencies of an integrated filter provided in the read channel.

In accordance with this embodiment, little or no additional circuitry or significant modification thereto is required to perform a tunable filter calibration procedure according to the present invention. For disk drive systems employing read channel circuitry differing significantly from that shown in FIG. 3, it is believed that only minor modifications or additions to existing read channel circuitry need be made in order to implement a tunable filter calibration procedure according to the present invention. It is understood that the techniques and circuitry for calibrating one or more cutoff frequencies of a tunable filter as described herein may be implemented and utilized in a wide variety of electronic systems and, in particular, in varying types of data processing and storing systems in general.

FIG. 3 depicts a number of components that process information signals derived from a data storage disk 73 using the read element of a read/write head 71 during normal disk drive system operation. The information signals obtained from the surface of disk 73 typically represent data or servo information stored thereon, but may include other types of information. The information stored on disk 73 is typically in the form of magnetic transitions on a series of concentric or serpentine tracks. The read/write head 71 may include a magnetoresistive (MR) read element, a giant magnetoresistive (GMR) read element, a thin-film read element, or other type of read transducer. It is understood that data storage disk 73 may store optical information, in which case read/write head 71 may include an optical read element.

During normal operation, an information signal induced in the read transducer of read/write head 71 is typically communicated to pre-amplification electronics, such as an arm electronics (AE) circuit or module 72. The AE module 72 amplifies the readback signal transmitted from the read/ write head 71, typically from the microvolt range to the millivolt range. The amplified readback signal is communicated from the AE module 72 to circuitry 75 which further processes the readback signal. The elements of circuitry 75 (excluding AE module 72, read/write head 71, and disk 73) are preferably, but not necessarily, integrated within the read channel. It is noted that various components of readback signal processing circuitry 75 illustrated in FIG. 3 are components typically employed in read channel applications.

In accordance with the embodiment illustrated in FIG. 3, the readback signal processing circuitry 75 includes a variable gain amplifier 76 which is coupled to AE module 72 through a multiplexer 65. A variable gain amplifier is understood in the art as an amplifier having a gain that is alterable in response to control signals, such as voltage control signals. VGA 76 is coupled to a continuous time filter (CTF) 78 through which readback signals are communicated and filtered during normal operation. CTF 78, as will be discussed in greater detail hereinbelow, represents a tunable filter which, when properly controlled in accordance with the principles of the present invention, provides for high precision adjustment of the filter's cutoff frequency.

CTF 78 is coupled to an analog-to-digital converter (ADC) 101 which digitizes analog filtered readback signals passed through CTF 78. During normal read operations, readback signals output from ADC 101 are transmitted to downstream circuitry for further processing along signal conductors (not shown) coupled to appropriate outputs of ADC 101. Digital output signals produced by ADC 101 and transmitted through conductor 81 are used by the control logic circuit 90 when performing a CTF cutoff frequency calibration procedure in accordance with the principles of the present invention.

In the embodiment shown in FIG. 3, VGA 76 is used to normalize the amplitude of the readback signal received from AE module 72. For example, the readback signal amplitude at the output of VGA 76/CTF 78 may be normalized at 800 mV$_{dpp}$ (differential peak-to-peak). In accordance with the circuit configuration shown in FIG. 3, a digital gain control converter 80 produces control voltage signals which are transmitted along conductors 77 to VGA 76 for purposes of adjusting the gain of VGA 76. The range of VGA control voltages typically span the range of expected voltage signals input to VGA 76. For example, VGA control voltages ranging between −400 mV to +400 mV corresponds to an operating gain range of the VGA 76 that permits normalization of the readback signal to 800 mV$_{dpp}$.

Gain control converter 80 produces gain control voltage signals in response to digital words received from control logic circuit 90. The gain control converter 80 transmits the gain control signals to VGA 76. As such, control logic circuit 90 effectively controls the gain of VGA 76 during a cutoff frequency calibration procedure according to the present invention. It is understood that the components depicted as individual circuit elements in FIG. 3, and other figures, may alternatively be integrated within one or more multiple-purpose components.

In one embodiment of the present invention particularly well-suited for use in filtering readback signals obtained from a data storage medium, CTF 78 is configured as a tunable lowpass filter. The ability to precisely establish the cutoff frequency of CTF 78 within a range of cutoff frequencies is typically necessary in order to compensate for data rate variability in the readback signals transmitted through the read channel. An exemplary continuous time filter which may be utilized in read channel applications and controlled using the methodologies of the present invention is described in U.S. Pat. No. 5,491,447 (Goetschel et al.), which is hereby incorporated herein by reference in its entirety. CTF 78 may thus be characterized as a filter having a tunable frequency response, by which the cutoff or corner frequency of the filter's lowpass response is adjustable within a range of frequencies bounded by a low cutoff frequency, $f_1$, and a high cutoff frequency, $f_2$.

CTF 78 includes a cutoff adjust input 89, a low calibration bit input 91, and a high calibration bit input 93, each of which is coupled to a corresponding output of the control logic circuit 90. The cutoff adjust input 89 is used to select a desired cutoff frequency. Due to factors such as technology and process variations, a selected CTF cutoff frequency often differs from the actual CTF cutoff frequency.

In accordance with the principles of the present invention, the low and high calibration bit inputs 91, 93 are used to precisely tune CTF 78 so that the actual cutoff frequency of CTF 78 matches the selected cutoff frequency. Control logic circuit 90 generates digital words which are transmitted to the cutoff adjust input 89, low calibration bit input 91, and high calibration bit input 93 of CTF 78 to control the frequency response (e.g., cutoff frequency) of CTF 78.

It will be immediately apparent to one skilled in the art that precisely calibrating desired low and high cutoff frequencies, $f_1$ and $f_2$, of a tunable filter is a difficult undertaking in view of inherent technology and circuit implementation factors, for example. Further, it may be necessary to modify the low and high cutoff frequencies, $f_1$ and $f_2$, of a tunable filter when read channel electronics or operating requirements are modified.

Figure 6:
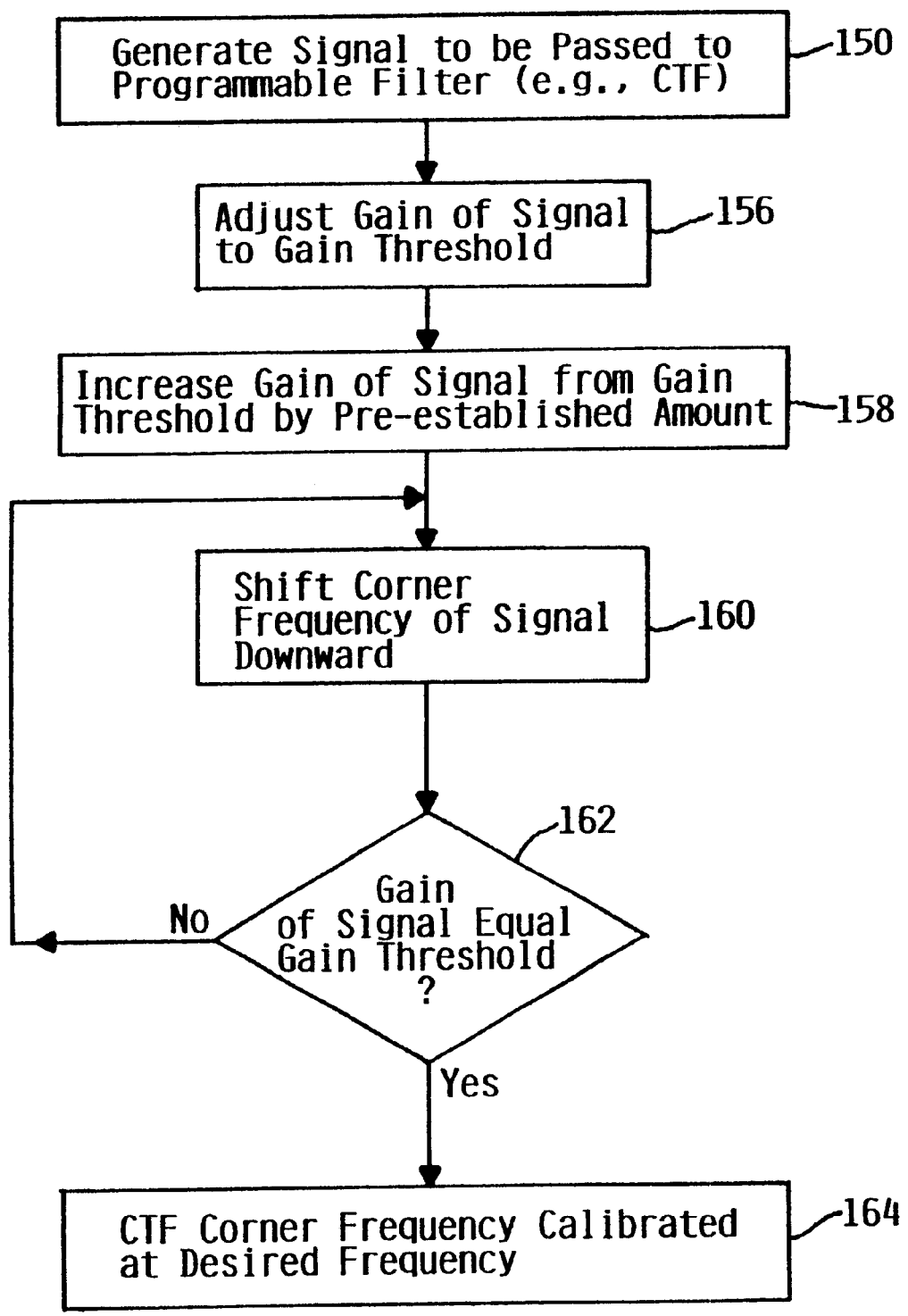
FIG. 6 depicts in flow diagram form several steps involving the calibration of a cutoff frequency associated with a tunable lowpass filter according to an embodiment of the present invention.

Turning now to FIG. 6, there is depicted a flow diagram showing several steps associated with calibrating a tunable filter, such as a tunable lowpass filter (e.g., CTF 78 shown in FIG. 3), according to the present invention. In broad and general terms, a signal to be processed by a tunable or programmable filter (e.g., CTF 78) during the calibration procedure is generated 150. The signal is a peak-detectable signal, such as a triangular or sinusoidal signal. The signal is generated to have a frequency equal to the target corner frequency and which falls within the pass band of the CTF 78. The gain of the signal is adjusted 156 to a pre-established gain threshold, as is indicated in the output voltage versus frequency characterization of CTF 78 provided in FIG. 4.

Figure 4:
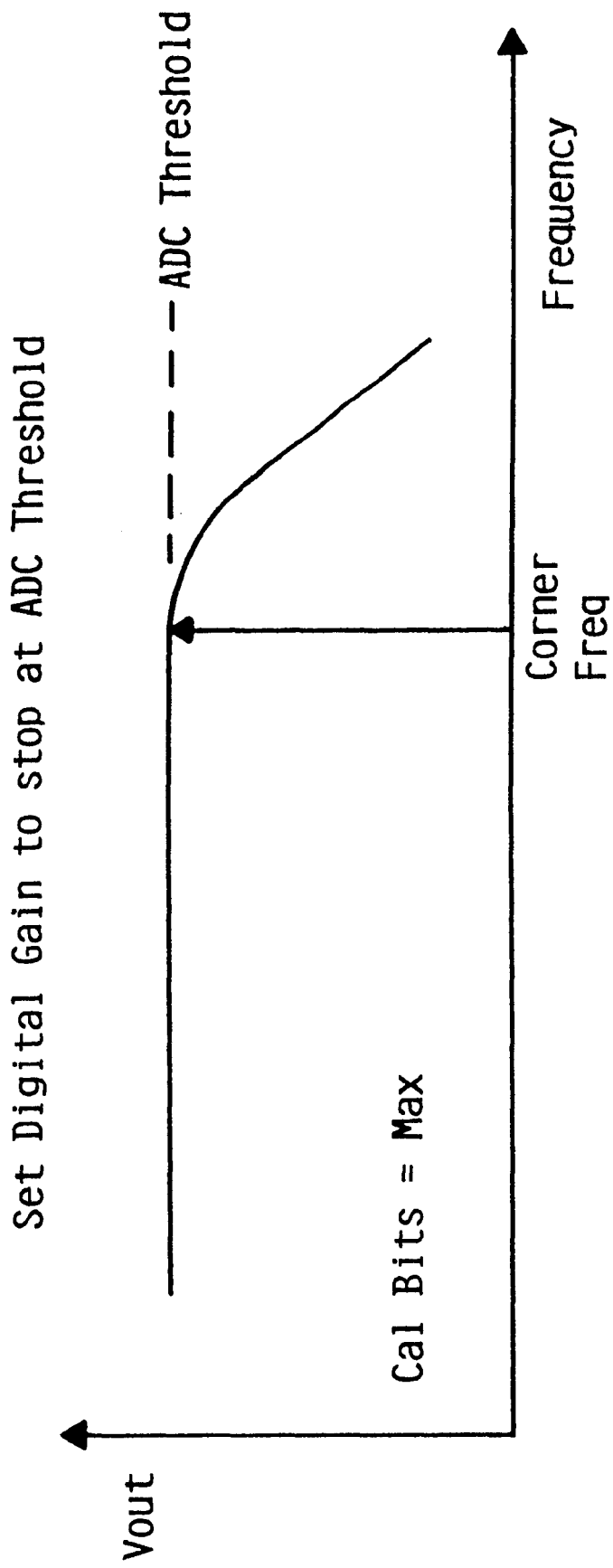
FIG. 4 is a graphical illustration of the frequency response of a tunable lowpass filter having a cutoff frequency that is adjustable according to an embodiment of the present invention.

FIG. 4 is a graphical illustration of the frequency response of a tunable lowpass filter, such as CTF 78 shown in FIG. 3, having a cutoff frequency that is adjustable according to an embodiment of the present invention. In FIG. 4, the gain of the signal is adjusted 156 until a pre-established gain threshold (e.g., ADC threshold) is reached. After reaching the pre-established gain threshold, the gain of the signal is increased 158 from the gain threshold by a pre-established amount. The tunable filter (e.g., CTF 78) is controlled so as to shift 160 the corner frequency of the signal downward. Downward adjustment of the signal's corner frequency continues 162 until the gain of the signal is equal to the pre-established gain threshold (i.e., ADC threshold).

Figure 5:
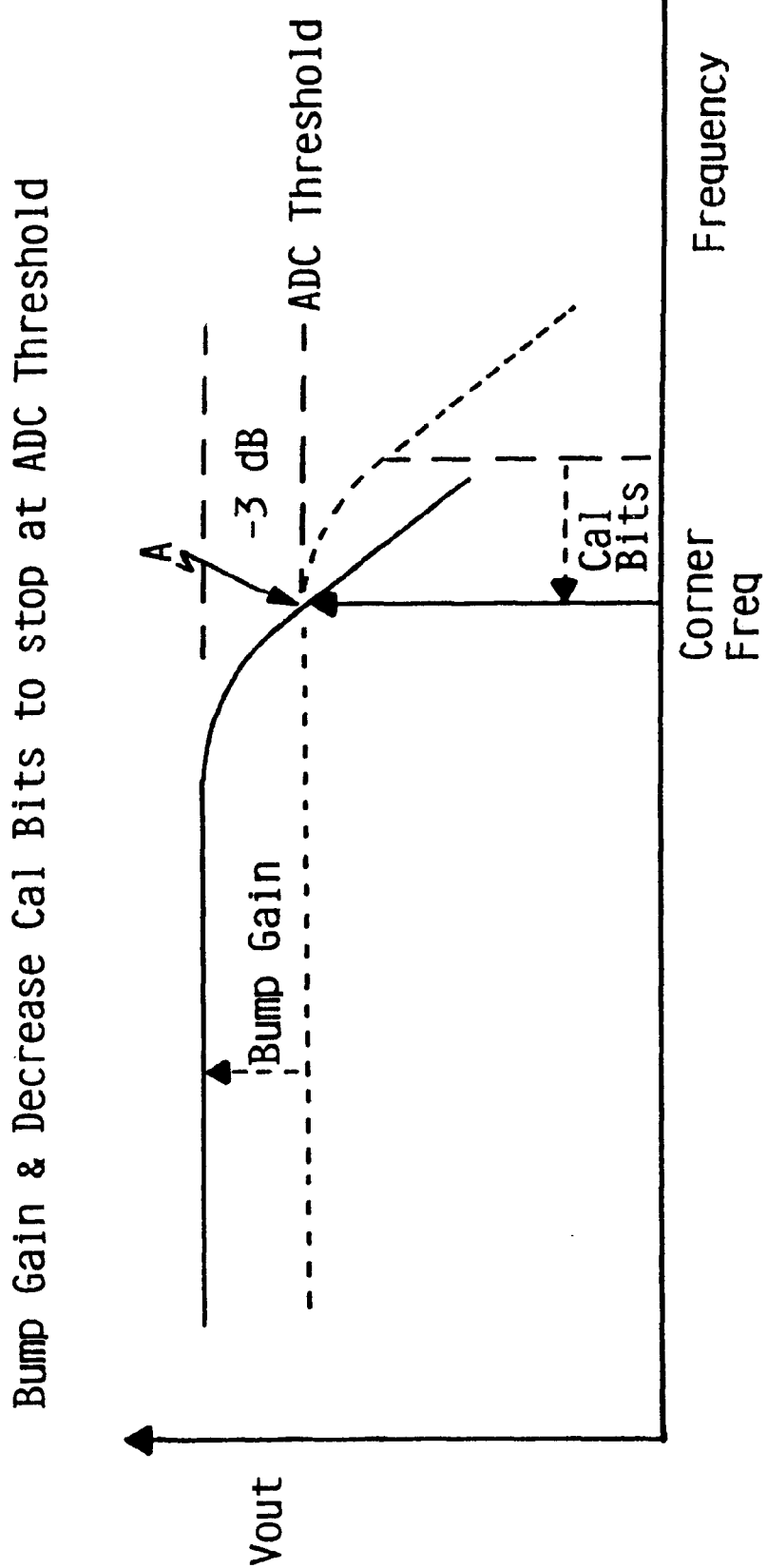
FIG. 5 is a graphical illustration of the frequency response of a tunable lowpass filter having a cutoff frequency that is subject to adjustment according to an embodiment of the present invention.

At the point of equivalency between the gain of the signal and the gain threshold, the corner frequency of the tunable filter (e.g., CTF 78) is calibrated 164 to the desired frequency. FIG. 5 shows the frequency response of CTF 78 as the gain of the signal is increased 158 from the gain threshold by the pre-established amount-in this case 3 dB-and the signal's corner frequency is downward shifted until the gain of the signal equals the pre-established gain threshold (i.e., point A in FIG. 5).

With continued reference to FIG. 3, a more detailed description of a CTF corner frequency calibration methodology according to another embodiment of the present invention will now be described. A signal used in the calibration procedure is generated by signal translator 61. The signal translator 61 is driven by a sequencer 107. A Write VCO (voltage controlled oscillator) 63 provides a proper signal to the sequencer 107. The sequencer 107 then divides the signal received from the WVCO 63 and converts the divided signal to a signal having a frequency equal to the target corner frequency. This signal is input into the VGA 76/CTF 78 via MUX 65.

As will be described in greater detail hereinbelow, a frequency parameter, referred to as an N Value, is used to set the WVCO 63 to a desired frequency. The N Value is transmitted from control logic circuit 90 to WVCO 63 via a WVCO tuner 112. The WVCO tuner 112, which is coupled to the WVCO 63, converts the N Value for purposes of setting the WVCO 63 to the correct frequency to be divided into the desired corner frequency.

A Servo VCO (SVCO) 109 provides the proper sampling frequency used by the ADC 101 via line 108. The output signal of the VGA 76/CTF 78 is digitized in the ADC 101 and captured by ADC capture logic 103. Line 81 is coupled between ADC 101 and ADC capture logic 103, and communicates ADC output data. The control logic circuit 90 receives these timed samples from ADC capture logic 103, digitally peak detects the value of the samples, and makes the appropriate digital signal gain adjustments followed by appropriate corner trim adjustments in accordance with the calibration techniques described previously and hereinbelow.

Figure 7:
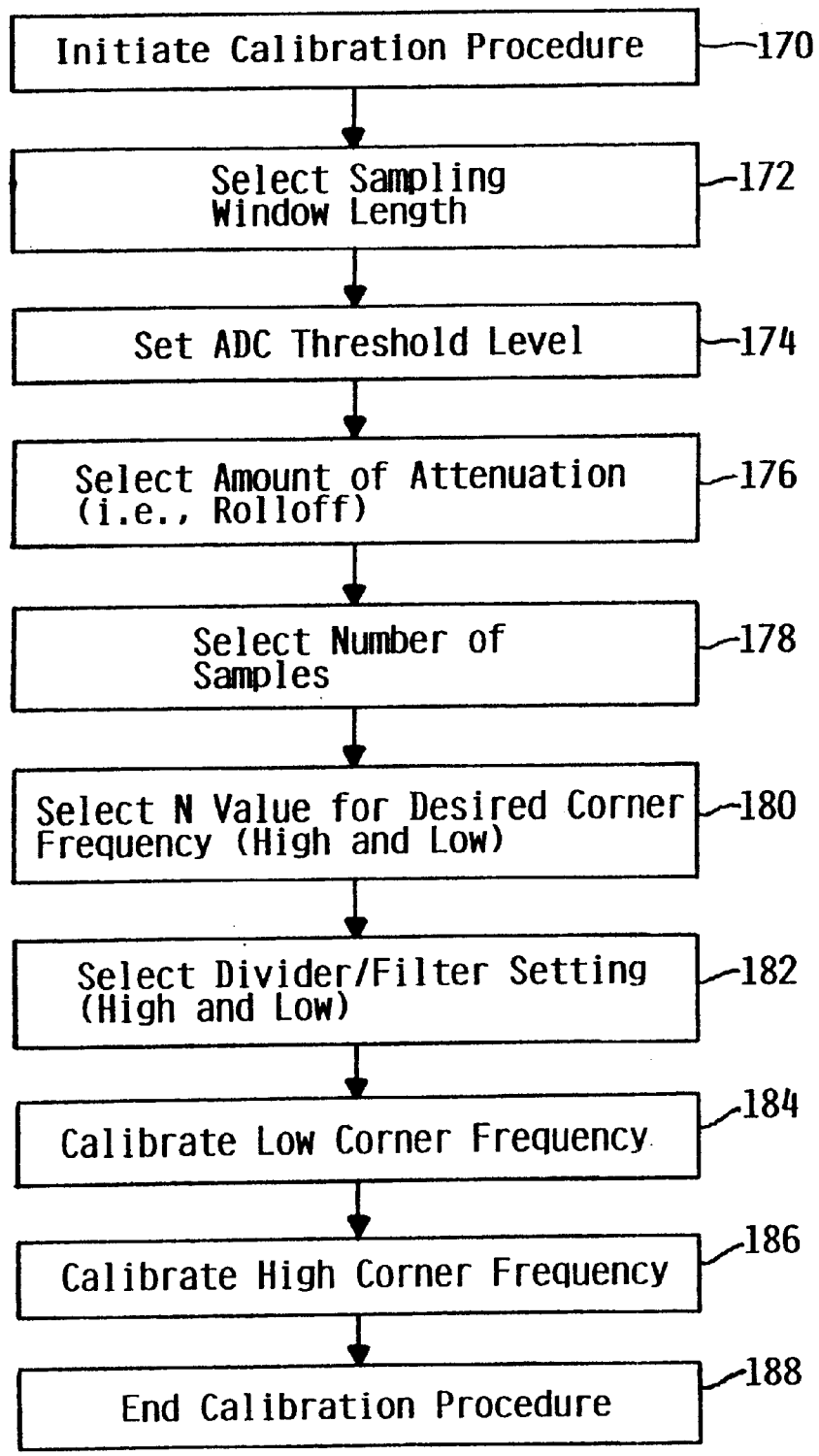
FIG. 7 is a flow diagram depicting several steps involving the calibration of a cutoff frequency associated with a tunable lowpass filter according to another embodiment of the present invention.

Turning now to FIG. 7, there is illustrated in flow diagram form several steps involving the calibration of a cut-off frequency associated with a tunable or programmable low pass filter according to a further embodiment of the present invention. Upon initiating the corner frequency calibration procedure 170, a number of parameters are initially established prior to performing an automatic corner frequency calibration. In particular, six different inputs are established to properly set-up the corner frequency calibration. These six inputs are typically established using inputs received by a user.

A sampling window is selected 172. A sampling window length specifies the time in which the digital peak detector of the control logic circuit 90 looks for valid samples. In one embodiment, the specified time or sampling window length defaults to 1,024 crystal clock cycles. The ADC threshold level is then set 174. The ADC threshold level, which represents a pre-established gain threshold, is a threshold in the ADC 101 that the peak detector of the control logic circuit 90 uses to determine if a sample should be captured. In one embodiment, the ADC threshold level is programmable and defaults to a positive detect level. The negative detect level is calculated from user inputted positive value as it is centered around an ADC threshold level code corresponding to a known signal state.

The amount of attenuation or roll-off is selected 176. The size of the roll-off represents the amount of attenuation the user wants to set the corner frequency to. The VGA 76, according to one embodiment, exhibits a 0.1 dB granularity per step, such that one code corresponds to a step of 0.1 dB. The attenuation is programmable, according to this embodiment, from 1 to 63 steps, and defaults to a step value of 30, which corresponds to 3 dB of attenuation.

The number of samples is then selected 178. This number represents the number of samples needed to detect a valid threshold crossing. The number of samples value is programmable, according to one embodiment, from 16 to 240, and defaults to a sample number value of 64.

An N Value which is used for establishing a desired corner frequency is selected 180. The N Value for a desired corner frequency represents a value which will be used during the appropriate corner frequency calibration (e.g., high corner or low corner). The N Value is used to set up the WVCO 63 to the desired frequency. In one embodiment, the user inputs four N Values, one N value for each of the four corners (high and low) associated with readback signal data and servo data, respectively.

A Divider/filter setting is selected 182. The Divider/filter parameter is selected to obtain the proper WVCO signal division needed to attain frequencies lower than 212 MHz. The Divider/filter selection parameter is used in conjunction with the N Value to attain the proper frequency. The user typically inputs all four Divider/filter settings for all four corners (i.e., data high and low, servo high and low).

After performing the above-described set-up steps, there is typically a delay period of a wait time (e.g., 8191 crystal period wait time) before the calibration actually starts. This wait time is needed to initiate a coarse tune in the write synthesizer which will convert the N Value to the proper prescale and tune bits to be applied to the WVCO 63. These prescale and tune bits are use to program the WVCO 63 to the proper frequency.

During this wait period, all of the appropriate circuit enables and calibrate control signals coordinated by or within control logic circuit 90 are applied, thereby readying the system for the calibration procedure. The control logic circuit 90 also sets up the sampling frequency of the ADC 101 during this wait period. Once the WVCO 63 is set up to the proper frequency, the calibration procedure starts by adjusting the corner calibrate bits to maximum, which pushes the corner out as far as possible. Then, the gain set-up preamble is initiated. The low and high corner frequencies are respectively calibrated 184, 186 in a manner described in greater detail hereinbelow, the completion of which indicates the completion 188 of the corner frequency calibration procedure.

Returning again to FIG. 3, the signal which the WVCO 63 provides via the sequencer 107 is preferably an ECL signal, which is received and filtered by an ECL-to-sine wave converter circuit (not shown) provided in or coupled to VGA 76. The ECL-to-sine wave converter circuit converts the ECL signal to a sinusoidal signal by band pass filtering the input signal using a selected bank of capacitors. This signal has already been divided down in the sequencer 107 to the proper frequency before it reaches the VGA 76.

The ECL-to-sine wave converter circuit acts as an alternate input to the VGA 76 while the VGA input switches are open. This signal then travels through the VGA 76 and CTF 78 and is digitized by the ADC 101, which is sampling using the servo half rate clock provided by the sequencer 107 via line 108. The signal is gain adjusted in the VGA 76 to achieve the proper signal level, which is then detected by the digital peak detector circuit in the control logic circuit 90 after the raw ADC samples are captured in the ADC capture logic 103.

Once the appropriate gain is determined, the control logic circuit 90 bumps or increases the VGA gain code by the user-specified amount. This is the point in the procedure in which the actual calibrate bits which control the CTF corner frequency are manipulated. The calibrate bits are adjusted until the same threshold used to determine the gain set-up is reached. This effectively moves the corner of the CTF to 3 dB below the pass band.

This sequence of events occurs four times in the case in which the channel calibrates a data low, data high, servo low, and servo high, preferably in that order. As was discussed previously, the user initially sets up the required six inputs discussed with respect to FIG. 7 and then the calibration of all four corners in the above-specified order occurs without any further set-up or user intervention.

Figure 8:
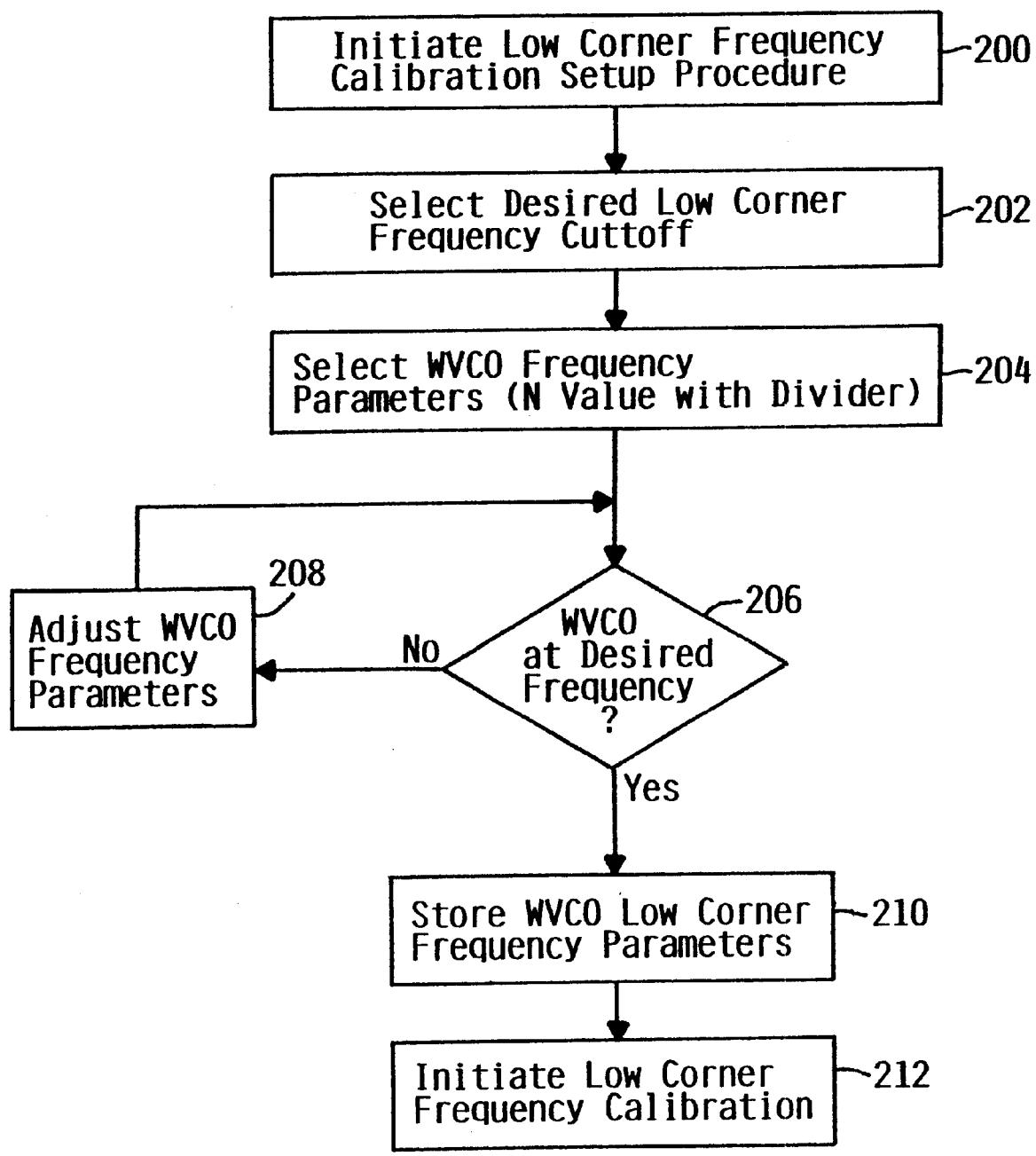
FIG. 8 depicts in flow diagram form several steps involving a setup procedure employed during calibration of a cutoff frequency representing the low end of a range of cutoff frequencies associated with a tunable lowpass filter according to an embodiment of the present invention.

Turning now to FIG. 8, there is illustrated various steps involving a low corner frequency calibration set-up procedure in accordance with an embodiment of the present invention. Upon initiation 200 of the low corner frequency calibration set-up procedure, a desired low corner frequency cutoff is selected 202. For example, a desired data low corner frequency may be set at 96.5 MHz. Various WVCO frequency parameters are then selected 204. In particular, the proper N Value with Divider for the desired corner frequency is determined.

By way of example, and assuming a desired low corner frequency of 96.5 MHz is selected and a valid WVCO frequency of 386 MHz is selected, the Divider parameter is computed by 386 MHz=D·96.5 MHz, from which D is calculated to be 4. Generally, the Divider parameter, D, is a whole number which is arrived at by modifying the WVCO frequency within a valid range of frequencies after having established the desired low corner frequency.

The value of the Divider parameter, D, may be computed using the following formula: Valid VCO Frequency= Divider·Corner Frequency. The N Value parameter may be computed using the following formula: N Value=Valid VCO Frequency·32/Crystal Frequency. Given the parameters above, the N Value is computed as 386 MHz·32/60 MHz= 206.

In general, the N Value and Divider parameters are computed by adjusting the WVCO frequency within a valid range of frequencies. If 206 the WVCO frequency does not provide the desired values for N Value and Divider, the WVCO frequency or frequency parameters are adjusted 208 appropriately. The N Value and Divider parameters associated with the low corner frequency parameters are stored 210 for later use during the low corner frequency calibration procedure.

Additional low corner frequency calibration set-up steps involve providing correct settings for the ECL Divider and input translator filter. In one embodiment, a high, mid, and low frequency range are considered valid choices. A high frequency range setting varies between 300–712 MHz with no division. A valid mid frequency range setting varies between 70–300 MHz with divide by 2 or 4. A valid low frequency range setting varies between 30–70 MHz with divide by 8. Having completed the low frequency calibration set-up procedure, the low corner frequency calibration procedure may be initiated 212.

Figure 9:
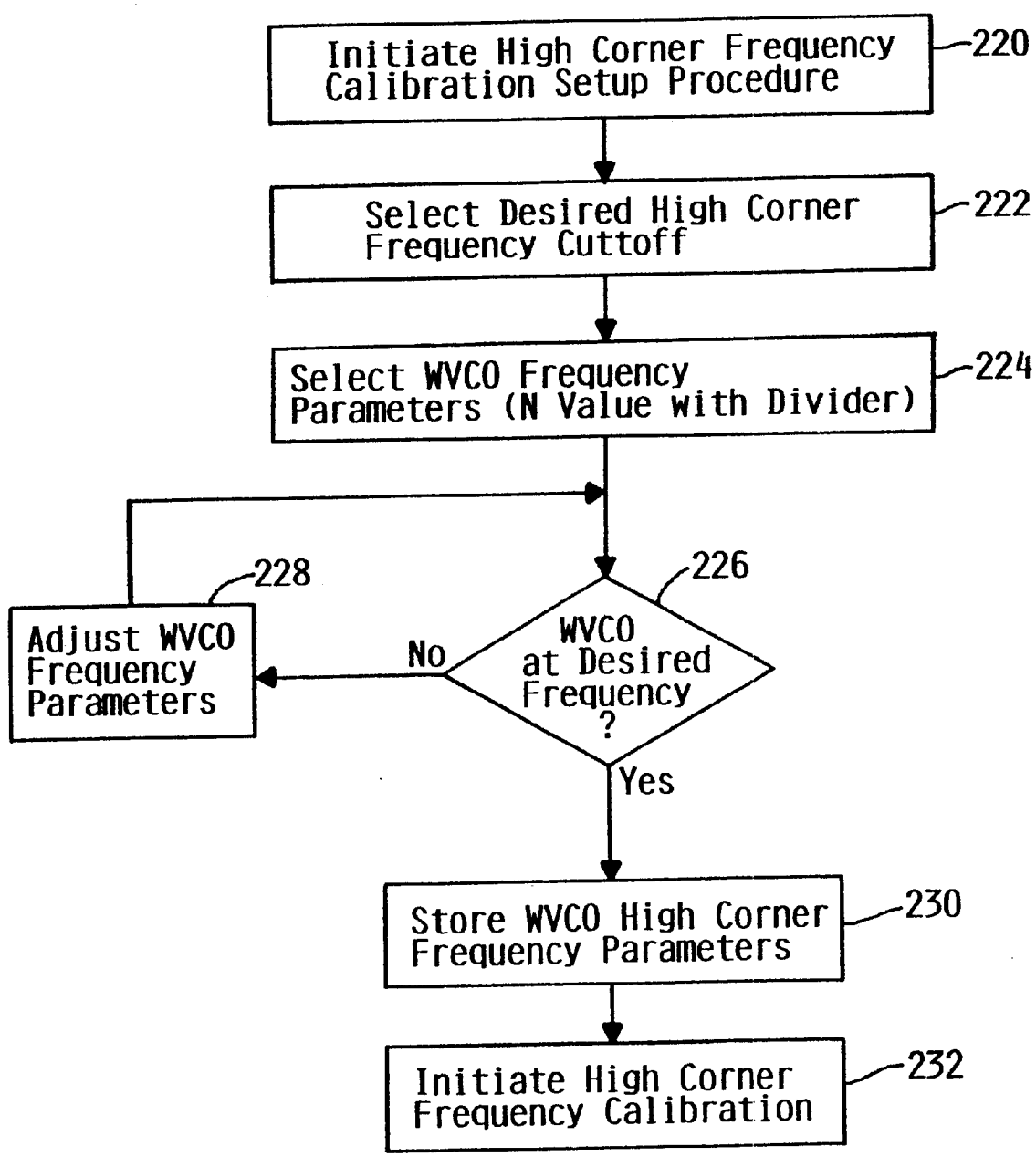
FIG. 9 is a flow diagram showing several steps involving a setup procedure employed during calibration of a cutoff frequency representing the high end of a range of cutoff frequencies associated with a tunable lowpass filter according to an embodiment of the present invention.

FIG. 9 illustrates various steps involving a high corner frequency calibration set-up procedure according to an embodiment of the present invention. After initiating the high corner frequency calibration set-up procedure 220, a desired high corner frequency cut-off is selected 222. By way of example, a desired high corner frequency cut-off may be set at 427.5 MHz. WVCO frequency parameters are then selected 224.

The WVCO N Value and Divider parameters may, for example, be established using the formula provided above (i.e., Valid WVCO Frequency=Divider·Corner Frequency). In one illustrative example, the Divider parameter may be set at 1, thereby providing a valid WVCO frequency of 427.5 MHz. The N Value may be computed by the previously discussed formula (i.e., N Value=Valid WVCO Frequency·32/Crystal Frequency). According to this example, the N Value may be computed as 427.5 MHz·32/60 MHz=228.

The WVCO frequency is adjusted 226, 228 during the WVCO frequency parameter selection or computation process as needed. The WVCO high corner frequency parameters are stored 230 for subsequent use during the actual high corner frequency calibration procedure, which may then be initiated 232.

Figure 10:
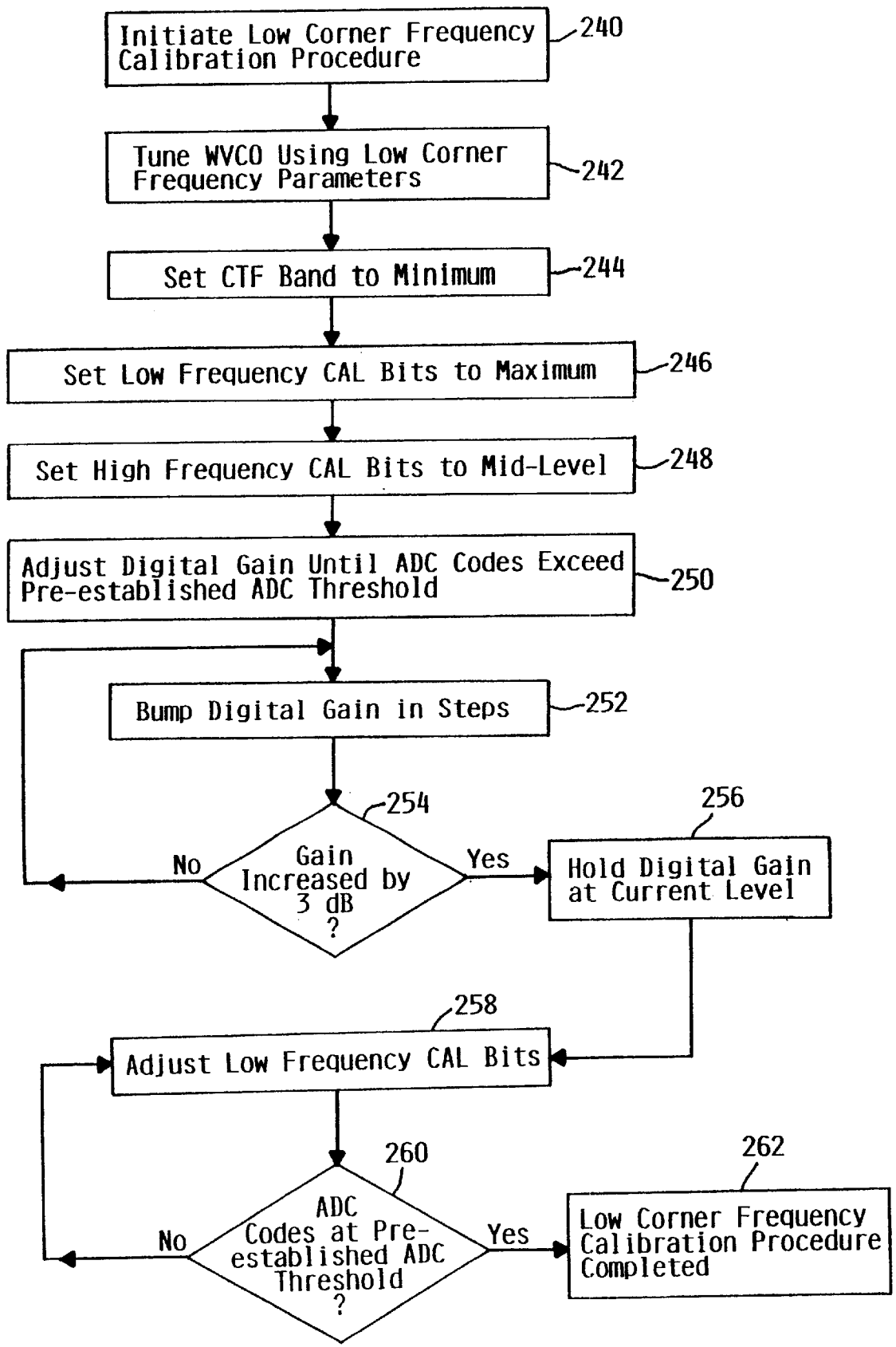
FIG. 10 depicts in flow diagram form several steps involving the calibration of a cutoff frequency representing the low end of a range of cutoff frequencies associated with a tunable lowpass filter according to the present invention.

FIG. 10 illustrates various steps involving a low corner frequency calibration procedure according to an embodiment of the present invention. The low corner frequency calibration procedure depicted in FIG. 10 advantageously occurs automatically, without requirement of user or processor interruption, after the low corner frequency calibration set-up procedure of FIG. 8 has been completed.

With reference to FIGS. 10 and 3, after initiating 240 the low corner frequency calibration set-up procedure, the WVCO 63 is tuned 242 to the appropriate frequency using the previously stored low corner frequency parameters (e.g., N Value). The filter band of the CTF 78 is set 244 to minimum. The low frequency cutoff adjust bits (CAL bits) input to CTF 78 via input 91 are set 246 to maximum, and the high frequency CAL bits input to CTF 78 via input 93 are set 248 to a mid-level setting.

The digital gain is adjusted 250 by the control logic circuit 90 in cooperation with the digital gain control converter 80 until the ADC codes exceed the pre-established ADC threshold. The digital gain is increased incrementally 252, 254 in accordance with the gain adjustment resolution of the VGA 76 until the digital gain is increased from the pre-established ADC threshold by 3 dB. In one embodiment, the VGA gain has a 0.1 dB granularity per code step. The desired 3 dB gain increase is achieved by bumping the digital gain by 30 code steps (i.e., 0.1 dB/code·30 codes=3 dB).

When the digital gain is increased from the pre-established ADC threshold by 3 dB, the digital gain is held 256 at this level, and the low frequency CAL bits are adjusted 258, 260 until the ADC codes reach the pre-established ADC threshold. When the ADC codes reach the pre-established ADC threshold, the low corner frequency has been calibrated 262 to the desired frequency.

Figure 11:
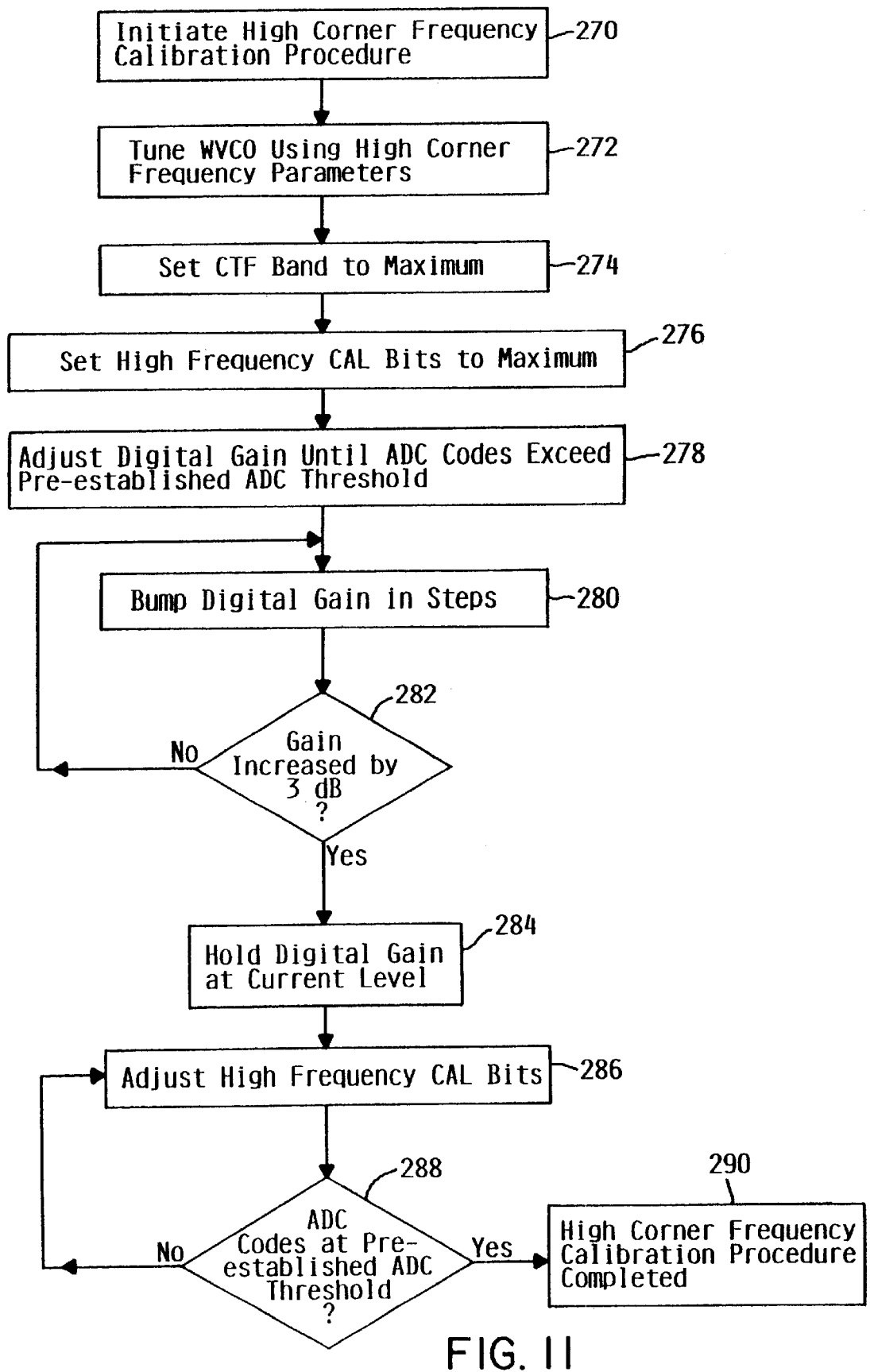
FIG. 11 depicts in flow diagram form several steps involving the calibration of a cutoff frequency representing the high end of a range of cutoff frequencies associated with a tunable lowpass filter according to the present invention.

FIG. 11 illustrates various steps involving a high corner frequency calibration procedure according to an embodiment of the present invention. The high corner frequency calibration procedure depicted in FIG. 11 advantageously occurs automatically, without requirement of user or processor interruption, after the high corner frequency calibration set-up procedure of FIG. 9 has been completed.

With reference to FIGS. 11 and 3, after initiating 270 the high corner frequency calibration set-up procedure, the WVCO 63 is tuned 272 to the appropriate frequency using the previously stored high corner frequency parameters (e.g., N Value). The filter band of the CTF 78 is set 274 to maximum. The high frequency CAL bits input to CTF 78 via input 91 are set 276 to maximum.

The digital gain is adjusted 278 by the control logic circuit 90 in cooperation with the digital gain control converter 80 until the ADC codes exceed the pre-established ADC threshold. The digital gain is increased incrementally 280, 282 in accordance with the gain adjustment resolution of the VGA 76 until the digital gain is increased from the pre-established ADC threshold by 3 dB.

When the digital gain is increased from the pre-established ADC threshold by 3 dB, the digital gain is held 284 at this level, and the high frequency CAL bits are adjusted 286, 288 until the ADC codes reach the pre-established ADC threshold. When the ADC codes reach the pre-established ADC threshold, the high corner frequency has been calibrated 290 to the desired frequency.

It is understood that the low and high cutoff frequency calibration procedures discussed above may each be implemented individually for calibrating a respective low or high cutoff frequency. The low and high cutoff frequency calibration procedures may also be implemented in combination for calibrating respective low and high cutoff frequencies of a range of cutoff frequencies associated with a tunable filter.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of calibrating a corner frequency of a tunable filter coupled to a read channel of a data storage system to a desired frequency, the method comprising:

generating a signal having a frequency substantially equal to the desired corner frequency;

adjusting a gain of the signal to a gain threshold;

increasing the gain of the signal from the gain threshold by a pre-established amount; and shifting the corner frequency of the signal until the gain of the signal is substantially equal to the gain threshold, at which point the corner frequency of the tunable filter is calibrated to the desired frequency.

2. The method of claim 1, wherein generating the signal comprises generating a peak-detectable signal.

3. The method of claim 1, wherein the pre-established amount is about 3 dB.

4. The method of claim 1, wherein shifting the corner frequency of the signal comprises shifting the corner frequency of the signal downward in frequency.

5. The method of claim 1, further comprising converting the signal from analog form to digital form to produce a digital signal, wherein adjusting the gain of the signal comprises digitally adjusting the gain of the digital signal to a digital gain threshold.

6. The method of claim 5, wherein increasing the gain of the digital signal comprises incrementally increasing the digital signal gain.

7. The method of claim 1, wherein shifting the corner frequency of the signal comprises shifting the corner frequency of the signal while the gain of the signal is held at the gain threshold plus the pre-established amount.

8. The method of claim 1, increasing the gain comprises increasing the signal gain by the pre-established amount of about 3 dB.

9. The method of claim 1, wherein the corner frequency of a tunable filter is a low or high corner frequency appropriate for filtering a data signal.

10. The method of claim 1, wherein the corner frequency of a tunable filter is a low or high corner frequency appropriate for filtering a servo signal.

11. A circuit for calibrating a cutoff frequency of a filter to a desired frequency, comprising:

a tunable filter;

a variable gain amplifier coupled to the filter and a signal source, the signal source generating a signal having a frequency substantially equal to the desired frequency;

an analog-to-digital converter (ADC) coupled to the filter, the ADC producing a digitized signal in response to receiving the signal from the filter; and a control circuit coupled to the filter, amplifier, signal source, and ADC, the control circuit adjusting a gain of the digitized signal to a gain threshold, increasing the gain of the digitized signal from the gain threshold by a pre-established amount, and shifting the corner frequency of the digitized signal until the gain of the digitized signal is substantially equal to the gain threshold, at which point the corner frequency of the filter is calibrated to the desired frequency.

12. The circuit of claim 11, wherein the signal source comprises a signal translator, the signal translator communicating a peak-detectable signal generated by the signal source to the amplifier.

13. The circuit of claim 12, wherein the signal source further comprises a sequencer coupled to the signal translator, the sequencer having servo inputs coupled to a servo voltage controlled oscillator and data inputs coupled to a tunable write voltage controlled oscillator.

14. The circuit of claim 11, wherein the control circuit communicates control signals to the signal source to set the signal source to a frequency to be divided into the desired corner frequency.

15. The circuit of claim 11, wherein the control circuit comprises a digital peak detector circuit that digitally peak detects the gain of the digitized signal received from the ADC.

16. The circuit of claim 11, wherein the control circuit communicates a control signal to the ADC to set a sampling frequency of the ADC.

17. The circuit of claim 11, further comprising ADC capture logic coupled between the ADC and the control circuit.

18. The circuit of claim 11, further comprising a digital gain controller coupled between the control circuit and the amplifier, the digital gain controller providing amplifier control signals to the amplifier in response to control signals received from the control circuit.

19. The circuit of claim 11, wherein the filter comprises a tunable lowpass filter.

20. The circuit of claim 11, wherein the circuit is implemented in-situ a read channel of a disk drive system.

21. A data storing system, comprising:

a data storage disk;

a data transfer head including a read transducer coupled to a read channel;

an actuator for providing relative movement between the head and the disk; and a circuit coupled to the read channel for calibrating a cutoff frequency of a filter to a desired frequency, the circuit comprising:

a tunable filter;

a variable gain amplifier coupled to the filter and a signal source, the signal source generating a signal;

an analog-to-digital converter (ADC) coupled to the filter, the ADC producing a digitized signal in response to receiving the signal from the filter; and a control circuit coupled to the filter, amplifier, signal source, and ADC, the control circuit adjusting a gain of the digitized signal to a gain threshold, increasing the gain of the digitized signal from the gain threshold by a pre-established amount, and shifting the corner frequency of the digitized signal until the gain of the digitized signal is substantially equal to the gain threshold, at which point the corner frequency of the filter is calibrated to the desired frequency.

22. The system of claim 21, wherein the signal source comprises a signal translator, the signal translator communicating a peak-detectable signal generated by the signal source to the amplifier.

23. The system of claim 22, wherein the signal source further comprises a sequencer coupled to the signal translator, the sequencer having servo inputs coupled to a servo voltage controlled oscillator and data inputs coupled to a tunable write voltage controlled oscillator.

24. The system of claim 21, wherein the control circuit communicates control signals to the signal source to set the signal source to a frequency to be divided into the desired corner frequency.

25. The system of claim 21, wherein the control circuit comprises a digital peak detector circuit that digitally peak detects the gain of the digitized signal received from the ADC.

26. The system of claim 21, wherein the control circuit communicates a control signal to the ADC to set a sampling frequency of the ADC.

27. The system of claim 21, further comprising ADC capture logic coupled between the ADC and the control circuit.

28. The system of claim 21, further comprising a digital gain controller coupled between the control circuit and the amplifier, the digital gain controller providing amplifier control signals to the amplifier in response to control signals received from the control circuit.

29. The system of claim 21, wherein the filter comprises a tunable lowpass filter.

30. The system of claim 21, wherein the circuit is implemented in-situ the read channel.

* * * * *